(12) United States Patent
Itou

(10) Patent No.: US 11,269,394 B2
(45) Date of Patent: Mar. 8, 2022

(54) DISPLAY DEVICE AND DISPLAY METHOD TO MINIMIZE POWER CONSUMPTION OF TOUCH-SCREEN UNIT

(71) Applicant: NTT DOCOMO, INC., Tokyo (JP)

(72) Inventor: Takurou Itou, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/469,305

(22) PCT Filed: Apr. 4, 2018

(86) PCT No.: PCT/JP2018/014489
§ 371 (c)(1),
(2) Date: Jun. 13, 2019

(87) PCT Pub. No.: WO2019/097741
PCT Pub. Date: May 23, 2019

(65) Prior Publication Data
US 2020/0272216 A1    Aug. 27, 2020

(30) Foreign Application Priority Data
Nov. 17, 2017  (JP) .............................. JP2017-222037

(51) Int. Cl.
*G06F 1/3231* (2019.01)
*G06F 1/3234* (2019.01)
(Continued)

(52) U.S. Cl.
CPC .......... *G06F 1/3231* (2013.01); *G06F 1/3262* (2013.01); *G06F 1/3265* (2013.01);
(Continued)

(58) Field of Classification Search
CPC ..... G09G 3/344; G06F 1/3262; G06F 1/3265; G06F 1/3212; G06F 1/3228; H04M 1/73; Y02D 10/00; H04W 4/021
See application file for complete search history.

(56) References Cited

U.S. PATENT DOCUMENTS 8,593,401 B1 * 11/2013 Kim ...................... G06F 1/1694
345/156
9,032,321 B1  5/2015 Cohen et al.
(Continued)

FOREIGN PATENT DOCUMENTS

EP    2958020 A1   12/2015
JP    2006-139145 A   6/2006
(Continued)

OTHER PUBLICATIONS

Notice of Reasons for Refusal issued in corresponding Japanese Patent Application No. 2019-553686, dated Jul. 21, 2020.
(Continued)

*Primary Examiner* — Laurence J Lee
(74) *Attorney, Agent, or Firm* — MKG, LLC

(57) ABSTRACT

Power supply unit supplies power to components of smartphone. Communication unit communicates with an external device. Touch-screen unit displays an image and receives a touch operation. Control unit causes smartphone to operate in an operation mode. For example, control unit causes smartphone to operate in a first sleep mode in which power supply unit supplies power to communication unit, and power supply unit refrains from supplying power to touch-screen unit while touch-screen unit maintains a displayed image.

18 Claims, 6 Drawing Sheets

(51) Int. Cl.
*G06F 3/041* (2006.01)
*G06F 3/0488* (2013.01)
*H04W 4/021* (2018.01)

(52) U.S. Cl.
CPC .......... *G06F 3/0412* (2013.01); *G06F 3/0488* (2013.01); *H04W 4/021* (2013.01)

(56) References Cited

U.S. PATENT DOCUMENTS

| | | | |
|---|---|---|---|
| 2007/0046622 A1* | 3/2007 | Kawai | G04G 9/00 345/107 |
| 2007/0296690 A1* | 12/2007 | Nagasaki | G09G 3/2011 345/107 |
| 2009/0237388 A1* | 9/2009 | Seki | G09G 3/344 345/211 |
| 2011/0047368 A1 | 2/2011 | Sundaramurthy et al. | |
| 2015/0243236 A1* | 8/2015 | Jain | G09G 3/20 345/690 |
| 2016/0086228 A1* | 3/2016 | Babb | G06Q 30/0267 705/14.64 |
| 2016/0189154 A1* | 6/2016 | Eramian | G06Q 20/4014 705/44 |

FOREIGN PATENT DOCUMENTS

| | | |
|---|---|---|
| JP | 2010-108274 A | 5/2010 |
| JP | 2015-149001 A | 8/2015 |

OTHER PUBLICATIONS

International Search Report issued in corresponding PCT Application No. PCT/JP2018/014489 dated May 22, 2018.
European Search Report issued in corresponding PCT Application No. PCT/JP2018/014489 dated Nov. 27, 2019, 8 pages.
Office Action issued in corresponding European Patent Application No. EP 18877929.2, dated Jul. 8, 2021.

* cited by examiner

| OPERATION MODE | POWER SUPPLY | | | | | IMAGE REWRITE EVENT DETECTION | DISPLAY OPERATION |
|---|---|---|---|---|---|---|---|
| | COMMUNICATION UNIT | POSITION MEASURING UNIT | DISPLAY UNIT | TOUCH OPERATION RECEIVING UNIT | | | |
| POWER OFF | NO | NO | NO | NO | | NO | FIXED DISPLAY |
| FIRST SLEEP | YES | YES | USUALLY NO (YES, ONLY WHEN EVENT IS DETECTED) | NO | | YES | EVENT UPDATE DISPLAY |
| SECOND SLEEP | YES | NO | USUALLY NO (YES, ONLY WHEN EVENT IS DETECTED) | YES | | YES | EVENT UPDATE DISPLAY |
| ACTIVE | YES | NO | USUALLY NO (YES, WHILE USER IS OPERATING, APPLICATION IS RUNNING, ETC.) | YES | | NO | OPERATION DISPLAY |

FIG. 4

| PRIOR OPERATION MODE | POST OPERATION MODE | | | |
|---|---|---|---|---|
| | POWER OFF | FIRST SLEEP | SECOND SLEEP | ACTIVE |
| POWER OFF | | | | MAIN BUTTON LONG PRESS |
| FIRST SLEEP | MAIN BUTTON LONG PRESS | | MAIN BUTTON NORMAL PRESS/RECEPTION OF CONNECTION REQUEST OR DOCUMENT DATA | |
| SECOND SLEEP | MAIN BUTTON LONG PRESS | MAIN BUTTON NORMAL PRESS/PASSAGE OF PREDETERMINED TIME | | SWIPE OPERATION |
| ACTIVE | MAIN BUTTON LONG PRESS | | MAIN BUTTON NORMAL PRESS/PASSAGE OF PREDETERMINED TIME | |

FIG. 5

DISPLAY DEVICE AND DISPLAY METHOD TO MINIMIZE POWER CONSUMPTION OF TOUCH-SCREEN UNIT

TECHNICAL FIELD

The present invention relates to terminating a user interface technique.

BACKGROUND ART

There is described in Japanese Patent Application No. JP 2006-139145 A1 a display operation panel including a liquid crystal panel and electronic paper (a display medium having a feature that a displayed image does not disappear after the display medium is turned off), which are stacked on an electrode substrate. The display operation panel, after entering a sleep mode so that the display operation panel is turned off, is configured to cause the electronic paper to display a default display screen for the sleep mode.

In the case of electronic paper, the above-mentioned technique of maintaining an image displayed on a touch-screen unit without consuming power is used. When this technology is applied to a display device such as a smartphone including a communication function, it is desirable to achieve power saving while maintaining convenience of communication.

An object of the present invention is to minimize power consumption of a touch-screen unit while maintaining convenience of communication.

To achieve the object, the present invention provides a display device comprising: a power supply unit configured to supply power to components of the display device; a communication unit configured to perform communication; a touch-screen unit configured to display an image and to receive a touch operation; and a control unit configured, upon detecting that a first condition is satisfied, to switch the display device to a first operation mode in which the power supply unit refrains from supplying power for enabling the touch-screen unit to receive a touch operation while the touch-screen unit maintains a displayed image, and the power supply unit supplies power to the communication unit.

The touch-screen unit may be configured to consume power to rewrite a displayed image and to consume no power to maintain a rewritten image, and in the first operation mode, the power supply unit may refrain from supplying power to the touch-screen unit while the touch-screen unit maintains a displayed image.

The display device may further comprise a detecting unit configured to detect an event that occurs in the display device, wherein in the first operation mode, the control unit may be configured, in response to detection of an event by the detecting unit, to cause the power supply unit temporarily to supply power to the touch-screen unit to enable the touch-screen unit to rewrite a displayed image to an image according to the event.

The display device may further comprise a measuring unit configured to measure a position of the display device, wherein: the detecting unit may be configured to detect measurement of a predetermined position by the measuring unit; and in the first operation mode, the control unit may be further configured, in response to detection of measurement of the predetermined position by the detecting unit, to cause the power supply unit temporarily to supply power to the touch-screen unit to enable the touch-screen unit to rewrite a displayed image to an image according to the predetermined position.

The display device may further comprise an operation receiving unit configured to receive an operation from a user, wherein: the detecting unit may be configured to detect reception of an operation by the operation receiving unit; and in the first operation mode, the control unit may be further configured, in response to reception of an operation by the detecting unit, to cause the power supply unit temporarily to supply power to the touch-screen unit to enable the touch-screen unit to rewrite a displayed image to an image according to the operation.

In the first operation mode, the control unit may be further configured, in response to reception of data by the communication unit, to cause the power supply unit temporarily to supply power to the touch-screen unit to enable the touch-screen unit to rewrite a displayed image to an image according to the data.

The control unit may be further configured, upon detecting that a second condition is satisfied, to switch the display device to a second operation mode in which the power supply unit supplies power to the touch-screen unit and the communication unit.

The control unit may be further configured, upon detecting that at least a third condition is satisfied, to switch the display device to a third operation mode in which the power supply unit refrains from supplying power to the components after the touch-screen unit rewrites a displayed image to a predetermined image.

The power supply unit may comprise a battery, the at least third condition may comprise plural conditions comprising a fourth condition that is satisfied by depletion of the battery, and the control unit may be further configured, upon detecting that one of the plural conditions is satisfied, to switch the display device to the third operation mode after the touch-screen unit rewrites a displayed image to an image determined depending on whether the satisfied condition is the fourth condition.

The present invention provides a display method for a display device comprising a power supply unit, a communication unit, and a touch-screen unit, the method comprising, upon detecting that a first condition is satisfied, switching the display device to a first operation mode in which the power supply unit refrains from supplying power for enabling the touch-screen unit to receive a touch operation while the touch-screen unit maintains a displayed image, and the power supply unit supplies power to the communication unit.

The present invention makes it possible to minimize power consumption of a touch-screen unit while maintaining convenience of communication.

BRIEF DESCRIPTION OF THE DRAWINGS

FIG. 4 is a diagram showing an example of an operation mode table.

FIG. 5 is a diagram showing an example of a switching condition table.

DETAILED DESCRIPTION

1 Exemplary Embodiment

Figure 1:
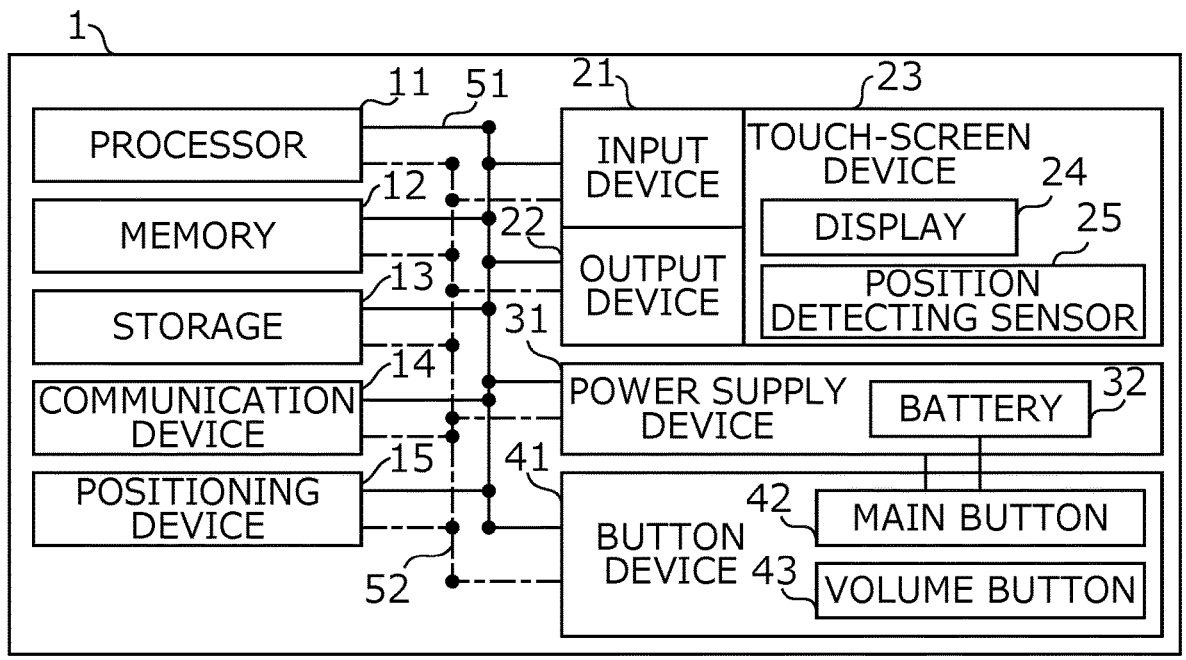
FIG. 1 is a diagram showing a hardware configuration of a smartphone according to an exemplary embodiment.

FIG. 1 shows a hardware configuration of smartphone 1 according to an exemplary embodiment, which is a computer including processor 11, memory 12, storage 13, communication device 14, positioning device 15, input device 21, output device 22, power supply device 31, button device 41, bus 51, and power supply circuit 52.

It is of note that the term "device" may refer to a circuit or unit. Smartphone 1 may include one or more devices shown in the drawing, or some of the devices shown in the drawing may not be included. Processor 11 controls a computer, for example, by running an operating system. Processor 11 may include a central processing unit (CPU) that includes interfaces to peripheral devices, a control device, an arithmetic device, and a register.

Processor 11 includes a built-in clock, from which processor 11 may acquire a current date and time. Processor 11 reads a program (program code) including an operating system (OS) and applications, a software module, and data from storage 13 and/or communication device 14 to memory 12.

Processor 11 performs various processes based on the read program and data. The various processes may be performed by a single processor 11, or may be performed by two or more processors 11 simultaneously or sequentially. Processor 11 may include one or more chips. The program may be obtained from a network via electronic communication media.

Memory 12 is a computer-readable recording medium, and, for example, includes at least one of a read only memory (ROM), an erasable programmable ROM (EEPROM), and a random access memory (RAM). Memory 12 may be referred to as a register, a cache, or a main memory. Memory 12 may store a program (program code), a software module, and data.

Storage 13 is a computer-readable recording medium, and, for example, includes at least one of a hard disk drive, a flexible disk, a flash memory (for example, a card, a stick, a key drive), and a magnetic strip. Storage 13 may be referred to as an auxiliary storage device. The recording medium may include, for example, a database, server, or any other suitable medium that includes memory 12 and/or storage 13.

Communication device 14 is hardware (a transmitting and receiving device) for enabling communication between computers via a wired and/or wireless network(s). Communication device 14 may be referred to as a network device, a network controller, a network card, or a communication module. In the present exemplary embodiment, communication device 14 performs wireless communication including mobile communication and wireless Local Area Network (LAN) communication.

Positioning device 15 is a device that measures a position of smartphone 1 by use of the Global Positioning System (GPS), for example. A positioning method may include base station positioning by which a position is measured based on a strength of communication with a base station, and WiFi positioning by which a position is measured based on a strength of communication with a WiFi access point.

Input device 15 is a device for accepting input from an external source, such as a microphone, a switch, buttons, and a sensor. Output device 16 is a device for performing output to an external device, such as a display, a speaker, and an LED lamp. In smartphone 1, input device 21 and output device 22 constitute touch-screen device 23.

Touch-screen device 23 is an output device that displays an image, and is also an input device that receives a user's operation. Touch-screen device 23 includes display 24 and position detecting sensor 25. Display 24 is a device for displaying an image. In the present exemplary embodiment, display 24 is an electrophoretic display device, which rewrites a displayed image by use of power, and maintains the rewritten image without consuming power.

Position detecting sensor 25 is a device that detects a position (touch position) touched by a user on display 24. Power supply device 31 is a device that includes battery 32 for storing power, and supplies power stored by battery 32 to components of smartphone 1. Button device 41 is provided with buttons including main button 42 and volume button 43, and receives operations performed on the buttons.

The devices such as processor 11 may access each other via bus 51 for data communication. Bus 51 may include a single bus, or may include plural buses for connecting devices. The devices such as processor 11 are supplied with power from power supply device 31 via power supply circuit 52. Power supply circuit 52 is a circuit connected to power supply device 31 to supply necessary power to the devices.

The devices other than main button 42 do not operate unless power is supplied from power supply device 31 via power supply circuit 52. Main button 42 is a power button. Main button 42 is supplied with power directly from battery 32, so that main button 42 may operate while no power is supplied from power supply device 31 through power supply circuit 52.

In the present exemplary embodiment, main button 42, when being held down while power supply device 31 supplies no power, provides power supply device 31 with a power ON signal for starting power supply. Upon receiving the power ON signal, power supply device 31 starts supplying power to the devices such as processor 11. Main button 42 is also used for another purpose, described later in detail. Volume button 43 is a button mainly used to increase or decrease a volume. Volume button 43 operates while button device 41 is supplied with power.

It is of note that smartphone 1 may include hardware such as a microprocessor, a digital signal processor (DSP), an application specific integrated circuit (ASIC), a programmable logic device (PLD), and a field programmable gate array (FPGA). The hardware may function as part or all of functional blocks. For example, processor 11 may include at least one of the items of hardware.

Figure 2:
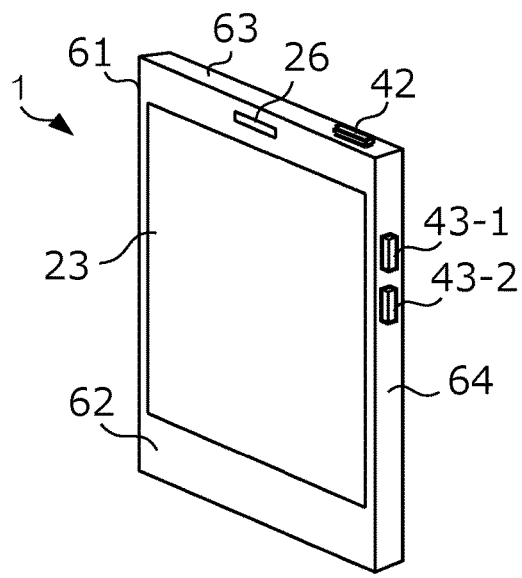
FIG. 2 is a diagram showing an appearance of the smartphone.

FIG. 2 shows an appearance of smartphone 1. Smartphone 1 includes housing 61 in the form of a thin rectangular parallelepiped, on the widest surface 62 of which a display surface of touch-screen device 23 is provided. Speaker port 26 is provided on the upper side of touch-screen device 23. Main button 42 is provided on upper surface 63 of housing 61, and volume buttons 43-1 and 43-2 are provided on side surface 64 of housing 61.

For example, volume button 43-1 is a button to increase a volume, and volume button 43-2 is a button to decrease a volume. Smartphone 1 is smaller than an ordinary smartphone such that widest surface 62 of housing 61 is the size of a credit card, for example. Housing 61 is thin enough to be easily put in a wallet or a business card holder.

Processor 11 of smartphone 1 runs a program to control components to provide functions described below.

Figure 3:
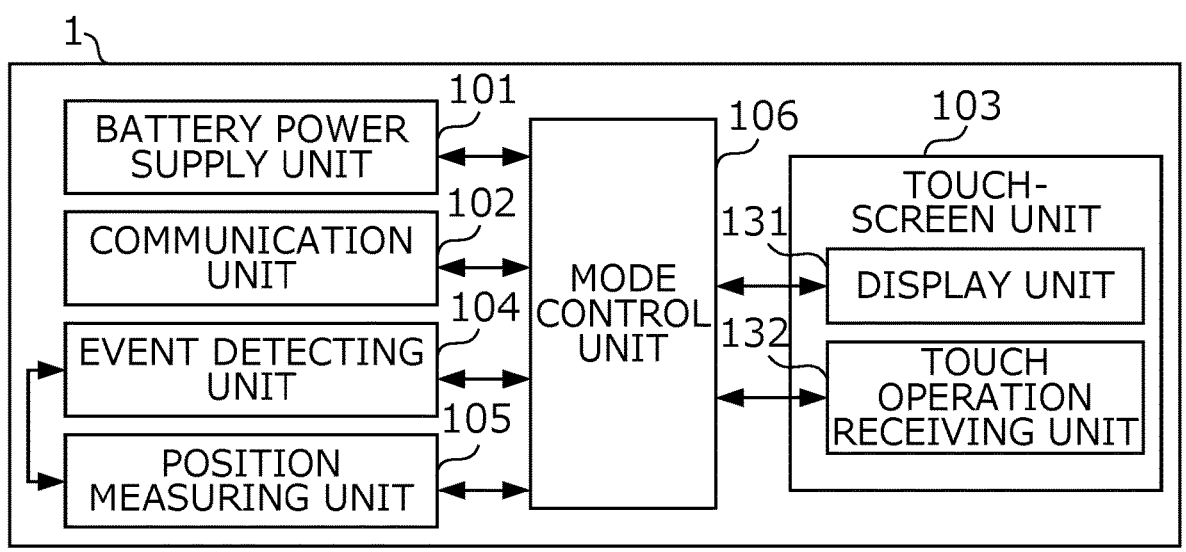
FIG. 3 is a diagram showing a configuration of functions provided by the smartphone.

FIG. 3 shows a configuration of functions provided by smartphone 1. Smartphone 1 includes battery power supply unit 101, communication unit 102, touch-screen unit 103, event detecting unit 104, position measuring unit 105, and mode control unit 106.

Battery power supply unit 101 includes battery 32 shown in FIG. 1, and supplies power to components of smart phone 1. Battery power supply unit 101 is an example of a "power supply unit" according to the present invention. Power supply device 31 shown in FIG. 1 serves as battery power supply unit 101. Battery power supply unit 101, under control of mode control unit 106 described later, supplies power to a function designated by mode control unit 106 based on an operation performed on button device 41.

Communication unit 102 performs a function for communicating with an external device. Communication unit 102 is an example of a "communication unit" according to the present invention. Communication device 14 shown in FIG. 1 serves as communication unit 102. Communication unit 102, when supplied with power from battery power supply unit 101, operates in a standby state so that communication unit 102 may readily start communication with an external device. When receiving a connection request signal from a base station of a mobile communication network during the standby state, and detecting a user's operation to start a call, communication unit 102 performs a connection process start mobile communication via the base station.

Communication unit 102, when receiving document data such as an email or a message posted on a social networking service (SNS), provides the received document data to processor 11 so that processor 11 may store the provided document data in memory 12. The storage of the document data is automatically performed without a user performing an operation, so that the user may access the document data without performing communication.

Touch-screen unit 103 includes display unit 131 that displays an image and touch-operation receiving unit 132 that receives a touch operation, and displays an image and receives a touch operation. Touch-screen unit 103 is an example of a "touch-screen unit" according to the present invention. Display 24 shown in FIG. 1 serves as display unit 131, and position detecting sensor 25 shown in FIG. 1 serves as touch operation receiving unit 132.

A touch operation is an operation of touching the surface of display 24 of touch-screen device 23 shown in FIG. 1 by use of a finger or a touch pen (or stylus pen). Touch-screen unit 103 (display unit 131) causes display 24, which is an electrophoretic display device as described above, to display an image; accordingly, touch-screen unit 103 consumes power to rewrite a displayed image, but does not consume power to maintain the rewritten image.

Event detecting unit 104 performs a function for detecting an event occurring in smartphone 1. Event detecting unit 104 is an example of a "detecting unit" according to the present invention. The event referred to here is an event that can be detected based on an operation of a component of smartphone 1, to perform an image rewriting. The event detected by event detecting unit 104 will hereinafter be referred to as an "image rewrite event." An image rewrite event is an example of an "event" according to the present invention. For example, event detecting unit 104 detects a change in minutes of a current time (for example, a change from 1:05 to 1:06) as an image rewriting event.

In the present exemplary embodiment, event detecting unit 104 detects an image rewriting event based on an operation of position measuring unit 105. Position measuring unit 105 performs a function for measuring a position of smartphone 1. Position measuring unit 105 is an example of a "measuring unit" according to the present invention. Positioning device 15 shown in FIG. 1 serves as position measuring unit 105. For example, event detecting unit 104 detects a measurement of a predetermined position by position measuring unit 105 as an image rewriting event. A specific example of the predetermined position will be described later.

Mode control unit 106 performs a function for causing smartphone 1 to operate in an operation mode. Mode control unit 106 is an example of a "control unit" according to the present invention. An operation mode defines functions of smartphone 1 to be activated and functions to be deactivated, and also may define operations to be performed by activated functions. In the present exemplary embodiment, mode control unit 106 causes smartphone 1 to operate in one of four operation modes including a "power-off mode," a "first sleep mode," a "second sleep mode," and an "active mode."

Mode control unit 106 controls power supply to components shown in FIG. 3, detection of an image rewrite event (whether to detect an image rewrite event), and a display operation of display unit 131 according to an operation mode. The targets for power supply control include communication unit 102, position measuring unit 105, display unit 131, and touch operation receiving unit 132. Communication device 14, positioning device 15, display 24, and position detecting sensor 25 serve as communication unit 102, position measuring unit 105, display unit 131, and touch operation receiving unit 132, respectively.

When mode control unit 106 designates a function as a power supply target for battery power supply unit 101, battery power supply unit 101 supplies power to a device that provides the function. In this manner, mode control unit 106 controls power supply to components. Mode control unit 106 performs such control by reference to an operation mode table stored in, for example, storage 13, which associates an operation mode, necessity of power supply to components, necessity of detection of an image rewrite event, and a display operation.

FIG. 4 shows an example of the operation mode table. The drawing shows that in a "power-off" mode, necessities of power supply for the "communication unit," the "position measuring unit," the "display unit," and the "touch operation receiving unit," which are functions shown in FIG. 3, are all "no," necessity of detection of an image rewrite event is "no," and a display operation is a "fixed display." The fixed display refers to causing display unit 131 to display a predetermined image continuously.

Since display unit 131 does not consume power to maintain a rewritten image, as described above, display unit 131 can perform a fixed display without receiving power supply. The "power-off" mode is a mode in which smartphone 1 is powered off and thus is inactive until powered on.

However, mode control unit 106 causes display unit 131 to display a predetermined power-off image for the power-off mode, before switching to the power-off mode, so that the power-off image is displayed continuously during the power-off mode. The power-off image may include, for example, a wallpaper image pre-stored by a provider of smartphone 1 or an image preset by a user for fixed display during the power-off mode.

Alternatively, mode control unit 106 may cause display unit 131 continuously to display an image showing contact information as the power-off image, in case smartphone 1 is lost. The contact information refers to information for contacting a user of smartphone 1, such as a telephone number or email address of the user's home.

In a "first sleep" mode, necessities of power supply for the "communication unit," the "position measuring unit," the "display unit," and the "touch operation receiving unit" are "yes," "yes," "usually no (temporarily yes)," and "no," respectively, necessity of detection of an image rewrite event is "yes," and a display operation is an "event update display." In the first sleep mode, mode control unit 106 prevents power supply to touch operation receiving unit 132 so that no touch operation can be received. Accordingly, if touchscreen device 23 is mistakenly touched, smartphone 1 does not operate.

On the other hand, in the first sleep mode, mode control unit 106 allows power supply to communication unit 102 so that communication unit 102 remains in a standby state in which communication unit 102 is able to receive a mobile communication connection request and document data such as an email. The event update display refers to updating a displayed image when an image rewrite event is detected by event detecting unit 104. The necessity of power supply to display unit 131 is "normally no;" however, power is supplied temporarily when an image is updated.

In the first sleep mode, measurement of a predetermined position by position measuring unit 105 is used as an image rewrite event; accordingly, mode control unit 106 allows power supply to position measuring unit 105. The event update display in the first sleep mode will be described using a specific example. Smartphone 1 is about the size of a credit card as described above, so that smartphone 1 may be put in an employee ID card case.

In the first sleep mode of the present exemplary embodiment, mode control unit 106 causes display unit 131 to display an employee ID card image showing a user's employee ID card. Also, in the first sleep mode, mode control unit 106 causes an event update display based on a position outside the site of the user's company.

Specifically, in the first sleep mode, when event detecting unit 104 detects measurement of a position outside the site of the company as an image rewrite event, namely when the user has left the site of the company, mode control unit 106 causes the employee ID card image showing personal information to be rewritten to a company mark image showing only a company mark. The company mark image is merely an example, and may be replaced with a preset wallpaper.

Mode control unit 106 also causes an event update display in the first sleep mode based on a position inside the site of the user's company. In the first sleep mode, when event detecting unit 104 detects measurement of a position inside the site of the company as an image rewrite event, namely when the user has entered the site of the company, mode control unit 106 causes the company mark image to be rewritten to the employee ID card image.

In a "second sleep" mode, necessities of power supply for the "communication unit," the "position measuring unit," the "display unit," and the "touch operation receiving unit" are "yes," "no," "usually no (temporarily yes)," and "yes," respectively, necessity of detection of an image rewrite event is "yes," and a display operation is an "event update display." In the second sleep mode, unlike the first sleep mode, mode control unit 106 allows power supply to touch operation receiving unit 132 so that a touch operation can be received.

However, reception of a touch operation in the second sleep mode is for switching the operation mode to an active mode, not for operating an image displayed by display unit 131. In the second sleep mode, as in the case of the first sleep mode, mode control unit 106 allows power supply to communication unit 102 so that communication unit 102 remains in a standby state in which communication unit 102 is able to receive a mobile communication connection request and document data such as an email.

In the second sleep mode, mode control unit 106 performs an event update display by use of a change in minutes of a current time as an image rewriting event. Specifically, in the second sleep mode, mode control unit 106 causes display unit 131 to display a different current time image every one minute. In the second sleep mode, mode control unit 106 performs an event update display by use of reception of a connection request by communication unit 102 as an image rewrite event.

In the second sleep mode, when communication unit 102 receives a connection request, mode control unit 106 causes display unit 131 to display an incoming call image indicating that a call has been received, as an image responsive to the connection request. Alternatively, an image responsive to the connection request may show a telephone number, a name, or a photograph of the caller. In the second sleep mode, mode control unit 106 performs an event update display by use of reception of document data by communication unit 102 as an image rewrite event.

In the second sleep mode, when external communication unit 102 receives document data, mode control unit 106 stores the received document data in a storage means such as storage 13, and causes display unit 131 to display a document reception image indicating that document data has been received (for example, an image showing a character string "mail received"), as an image responsive to the connection request. Alternatively, an image generated responsive to the document data may show the beginning of the document, or a mail address or SNS account of the sender.

In the second sleep mode of the present exemplary embodiment, measurement of a position is not used as an image rewrite event; accordingly, mode control unit 106 does not allow power supply to position measuring unit 105. It is of note that the foregoing image rewrite events used for event update display, whether for the first sleep mode or the second sleep mode, are merely examples, and are not limiting.

In an "active" mode, necessities of power supply for the "communication unit," the "position measuring unit," the "display unit," and the "touch operation receiving unit" are "yes," "no," "usually no (temporarily yes)," and "yes," respectively, necessity of detection of an image rewrite event is "no," and a display operation is an "operation display." The operation display refers to display according to a user's operation such as a touch operation or a button operation. Among the four operations modes, the operation display is performed only in the active mode.

In the active mode, an image rewriting event is not detected; accordingly, mode control unit 106 does not allow power supply to position measuring unit 105. However, position measuring unit 105 may be supplied with power to be used by an application, by a function other than performed by mode control unit 106. In the active mode, mode control unit 106 allows power supply to touch operation receiving unit 132 so that an operation display may be performed.

In the active mode, display unit 131 is supplied with power only when an image is rewritten by, for example, a user's operation or an application's operation. In the active mode, mode control unit 106 allows power supply to communication unit 102 so that communication unit 102 remains in a standby state in which communication unit 102 is able to receive a mobile communication connection request and document data such as an email. Mode control unit 106 switches the foregoing four operation modes with reference to a switching condition table stored in, for example, storage 13, which associates a prior operation mode and a post operation mode.

FIG. 5 shows an example of the switching condition table. The drawing shows that in a case where a prior operation mode is the "power-off" mode, a post operation mode is only the "active" mode, and a switching event is "main button long press." Mode control unit 106, upon detecting a "main button long press" in the "power-off" mode, switches the "power-off" mode to the "active" mode.

In a case where a prior operation mode is the "first sleep" mode, mode control unit 106, upon detecting a "main button long press," switches to the "power-off" mode, and upon detecting a "main button normal press" or "reception of connection request or document data," switches to the "second sleep" mode. The "normal press" is an operation of pressing a button for so short a time that the operation is not determined to be a long press. In the first sleep mode, where no touch operation is received, an operation of communication unit 102, which is supplied with power and main button 42, which works without power, are used as a switching event.

In a case where a prior operation mode is the "second sleep" mode, mode control unit 106, upon detecting a "main button long press," switches to the "power-off" mode, upon detecting a "main button normal press" or "passage of predetermined time," switches to the "first sleep" mode, upon detecting a "swipe operation," switches to the "active" mode. In the second sleep mode, where a touch operation can be received, a swipe operation (an operation of moving a touch position in any direction from an any point on the display surface) is used as a switching event.

In a case where a prior operation mode is the "active" mode, mode control unit 106, upon detecting a "main button long press," switches to the "power-off" mode, and upon detecting a "main button normal press" or "passage of predetermined time," switches to the "second sleep" mode. In the present exemplary embodiment, the active mode switches to the second sleep mode after passage of a predetermined time, and the second sleep mode switches to the first sleep mode after further passage of the predetermined time.

The first sleep mode and the second sleep mode may be switched manually by performing a normal press on main button 42. The first sleep mode switches to the second sleep mode in the event of reception of a connection request, and thereafter an incoming call image is displayed as an event update display. The second sleep mode switches to the active mode in the event of a swipe operation so that a user may start a call by operating a call start button displayed by a telephone application.

As described in the foregoing, mode control unit 106 switches an operation mode of smartphone 1 upon detecting that a switching condition is satisfied. For example, mode control unit 106, upon detecting a normal press of main button 42 or passage of a predetermined time in the second sleep mode, determines that a switching condition has been satisfied, and switches to the first sleep mode. The first sleep mode is an operation mode in which battery power supply unit 101 supplies power to communication unit 102.

The first sleep mode is an example of a "first operation mode" according to the present invention. A switching condition to be satisfied to start the first condition is an example of a "first condition" according to the present invention. The first sleep mode is an operation mode in which battery power supply unit 101 does not supply power to touch-screen unit 103 while touch-screen unit 103 maintains an image (while an event update display is in progress).

However, in the first sleep mode, when event detecting unit 104 detects an image rewrite event, mode control unit 106 causes battery power supply unit 101 temporarily to supply power to touch-screen unit 103 so that touch-screen unit 103 can rewrite a displayed image to an image according to the detected image rewrite event.

As an image rewrite event in the present exemplary embodiment, measurement of a position (for example, a position inside or outside the site of a company) is used. Mode control unit 106, when measurement of a position outside the site of a company is detected as an image update event, causes an employee ID card image to be rewritten to a company mark image (an image according to the detected image rewrite event), and when measurement of a position inside the site of the company is detected as an image update event, causes the company mark image to be rewritten to the employee ID card image (an image according to the detected image rewrite event).

In the first sleep mode of the present exemplary embodiment, when event detecting unit 104 detects measurement of a predetermined position by position measuring unit 105, mode control unit 106 causes battery power supply unit 101 temporarily to supply power to touch-screen unit 103 so that touch-screen unit 103 can rewrite a displayed image to an image (for example, a company mark image or an employee ID card image) according to the position measured by position measuring unit 105.

The second sleep mode is an example of a "second operation mode" according to the present invention. A switching condition to be satisfied to start the second condition is an example of a "second condition" according to the present invention. The second sleep mode is an operation mode in which battery power supply unit 101 supplies power to touch-screen unit 103 while touch-screen unit 103 maintains an image (while an event update display is in progress), and battery power supply unit 101 supplies power to communication unit 102.

In the present exemplary embodiment, mode control unit 106, upon detecting a long press of main button 42 in the first sleep mode, the second sleep mode, or the active mode, determines that a switching condition has been satisfied, and switches an operation mode of smartphone 1 to the power-off mode. The power-off mode is an operation mode in which battery power supply unit 101 does not supply power to any components of smartphone 1. The power-off mode is an example of a "third operation mode" according to the present invention. The switching condition to be satisfied to start the power-off mode is an example of a "third condition" according to the present invention.

Before switching to the power-off mode, mode control unit 106 causes touch-screen unit 103 to rewrite a displayed image to the predetermined power-off image. Mode control unit 106 switches an operation mode of smartphone 1 to the second sleep mode or the active mode upon detecting a corresponding switching condition shown in FIG. 5.

Smartphone 1 having the configuration described in the foregoing performs a mode switching process for switching an operation mode.

Figure 6:
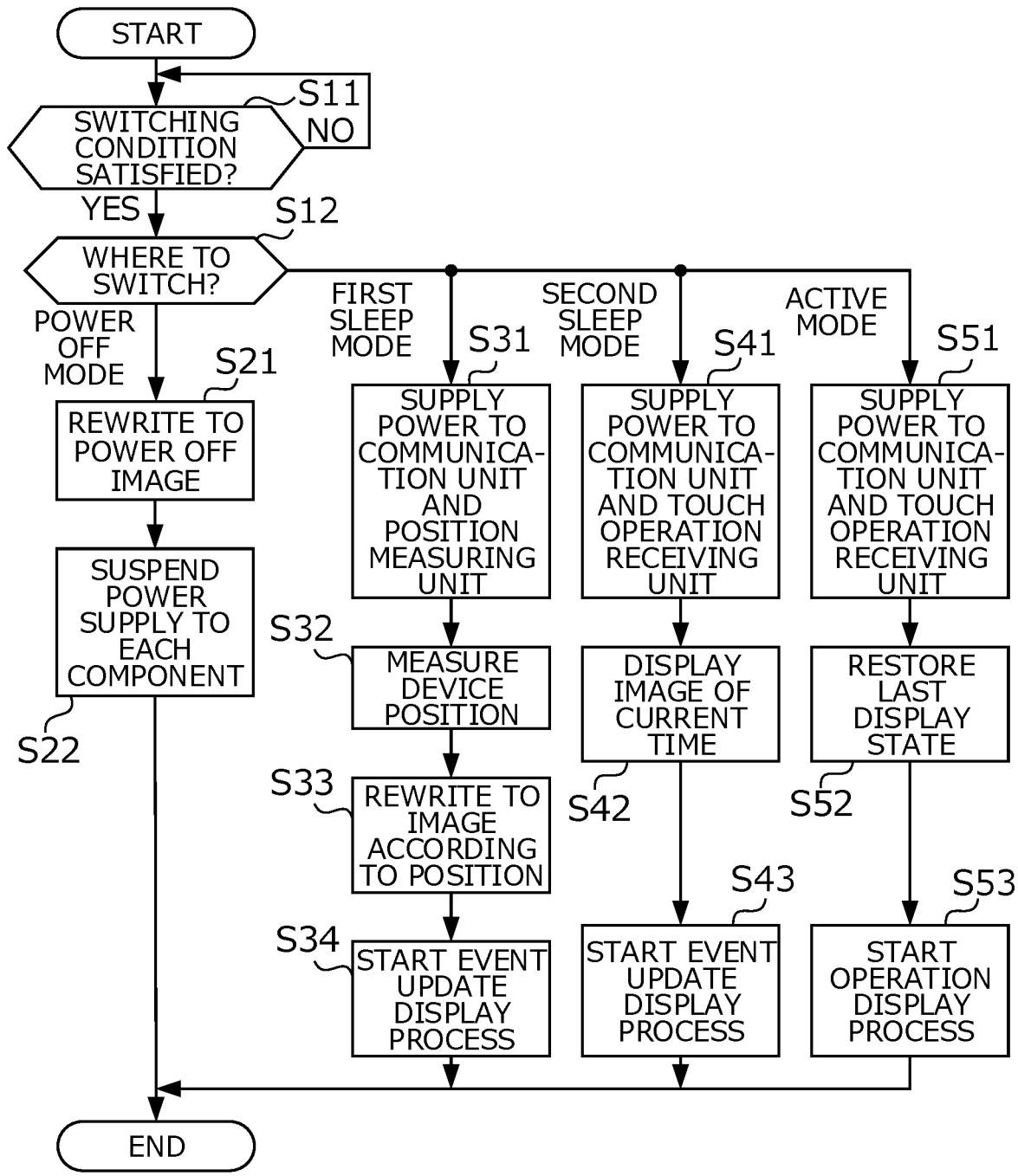
FIG. 6 is a diagram showing an example of an operation procedure of a mode switching process.

FIG. 6 is a diagram showing an example of an operation procedure of the mode switching process. The operation procedure may be repeated while smartphone 1 is running. Initially, smartphone 1 (mode control unit 106) determines whether a switching condition of a current operation mode has been satisfied, based on the current operation mode and the switching condition table shown in FIG. 5 (step S11).

Smartphone 1 (mode control unit 106) repeats step S11 until smartphone 1 determines that a switching condition has been satisfied (YES). When determining that a switching condition has been satisfied (YES), smartphone 1 (mode control unit 106) identifies an operation mode to switch to (step S12). When identifying the power-off mode as an operation mode to switch to, smartphone 1 (mode control unit 106) causes a displayed image to be rewritten to the power-off image (step S21).

Subsequently, smartphone 1 (mode control unit 106) suspends supplying power to components of smartphone 1 (step S22), and ends the operation procedure. As a result, the power-off image displayed at step S21 continues to be displayed during the power-off mode during which the power-off image cannot be rewritten.

At step S12, when identifying the first sleep mode as an operation mode to switch to, smartphone 1 (mode control unit 106) causes battery power supply unit 101 to supply power to communication unit 102 and position measuring unit 105 (step S31), if the functions are not supplied with power. Subsequently, smartphone 1 (position measuring unit 105) measures its position (step S32).

Subsequently, smartphone 1 (mode control unit 106) causes display unit 131 to rewrite a displayed image to an image according to the measured position (step S33). For example, display unit 131 may display a company mark image as an image according to a position outside the site of a company, and display an employee ID card image as an image according to a position inside the site of the company. Subsequently, smartphone 1 (mode control unit 106) starts an event update display process (step S34), and ends the operation procedure. Details of the event update display process will be described later with reference to another diagram.

At step S12, when identifying the second sleep mode as an operation mode to switch to, smartphone 1 (mode control unit 106) causes battery power supply unit 101 to supply power to communication unit 102 and touch operation receiving unit 132 (step S41). Subsequently, smartphone 1 (mode control unit 106) causes display unit 131 to display a current time image (step S42). Subsequently, smartphone 1 (mode control unit 106) starts the event update display process (step S43), and ends the operation procedure.

At step S12, when identifying the active mode as an operation mode to switch to, smartphone 1 (mode control unit 106) causes battery power supply unit 101 to supply power to communication unit 102 and touch operation receiving unit 132 (step S51). Subsequently, smartphone 1 (mode control unit 106) restores, for example, a screen that was on display at the end of the last active mode (step S52). Subsequently, smartphone 1 starts an operation display process for displaying an image according to a user's operation (step S53), and ends the operation procedure.

Figure 7:
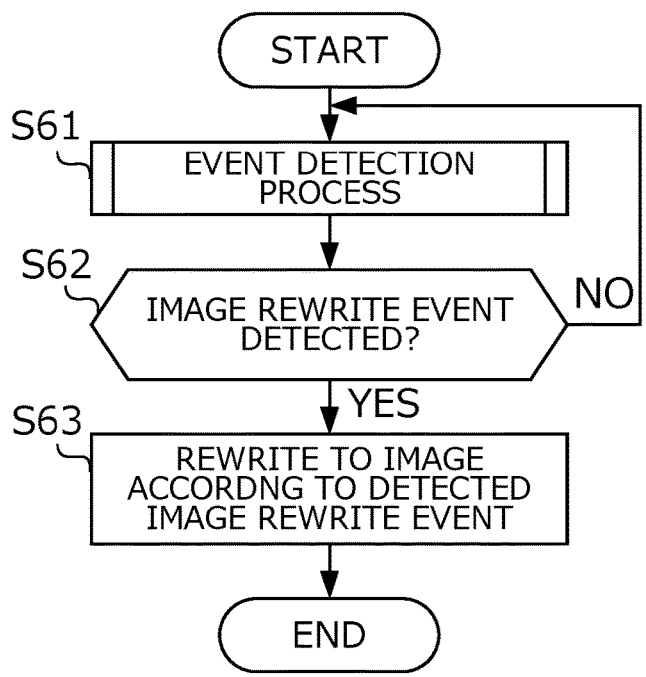
FIG. 7 is a diagram showing an example of an operation procedure of an event update display process.

FIG. 7 is a diagram showing an example of an operation procedure of the event update display process. Initially, smartphone 1 (event detection unit 104) performs an event detection process for detecting an image rewrite event such as measurement of a predetermined position (step S61). Smartphone 1 (mode control unit 106) determines whether an image rewrite event has been detected in step S61 (step S62), and when determining that no image rewrite event has been detected in step S61 (NO), returns to step S61.

At step S62, when determining that an image rewrite event has been detected in step S61 (YES), smartphone 1 (mode control unit 106) causes an image according to the detected image rewrite event, such as a current time image, a company mark image, or an employee ID card image (step S63) to be displayed, and ends the operation procedure. Smartphone 1 repeatedly performs the operation procedure shown in FIG. 7 while operating in the first sleep mode or the second sleep mode.

In the present exemplary embodiment, smartphone 1 continues to display a power-off image showing information such as contact information in the power-off mode in which power is hardly consumed. In the sleep modes including the first sleep mode and the second sleep mode, in which less power is consumed than in the active mode, smartphone 1 basically refrains from rewriting an image to minimize power consumption, and only upon detecting an image rewrite event, performs an event update display.

In the event update display, where power is consumed only when an image is rewritten, time-varying information such as a current time may be displayed in a power-saving manner. In the first sleep mode, measurement of a predetermined position of smartphone 1 is used as an image rewrite event, so that an image suited to a user's position, such as an employee ID card image or a company mark image, may be displayed in a power-saving manner.

In the first sleep mode, no touch operation can be received, thus preventing a situation that a user carrying smartphone 1 or putting smartphone into his/her chest pocket touches touch-screen unit 103 of smartphone 1, thereby causing a power-saving image such as an employee ID card image or a company mark image to disappear.

In the first sleep mode, communication unit 102 is supplied with power to be maintained in a standby state so that communication is possible while saving power for display. In the first sleep mode, where touch-screen unit 103 is not supplied with power, consumption of power used for touch-screen unit 103 is minimized.

2 Modifications

The above exemplary embodiment is merely an example of an embodiment of the present invention, and may be modified as described below.

2-1 Button

Button device 41 may include a button other than main button 42 and volume button 43, such as a lock button, a home button, a back button, or a history button. Smartphone 1 may include non-tangible buttons such as buttons the pressing of which can be detected by a touch sensor.

2-2 Image Rewrite Event (Part 1)

Image rewrite events are not limited to those described in the foregoing. For example, a predetermined operation performed by a user may be used as an image rewrite event.

Figure 8:
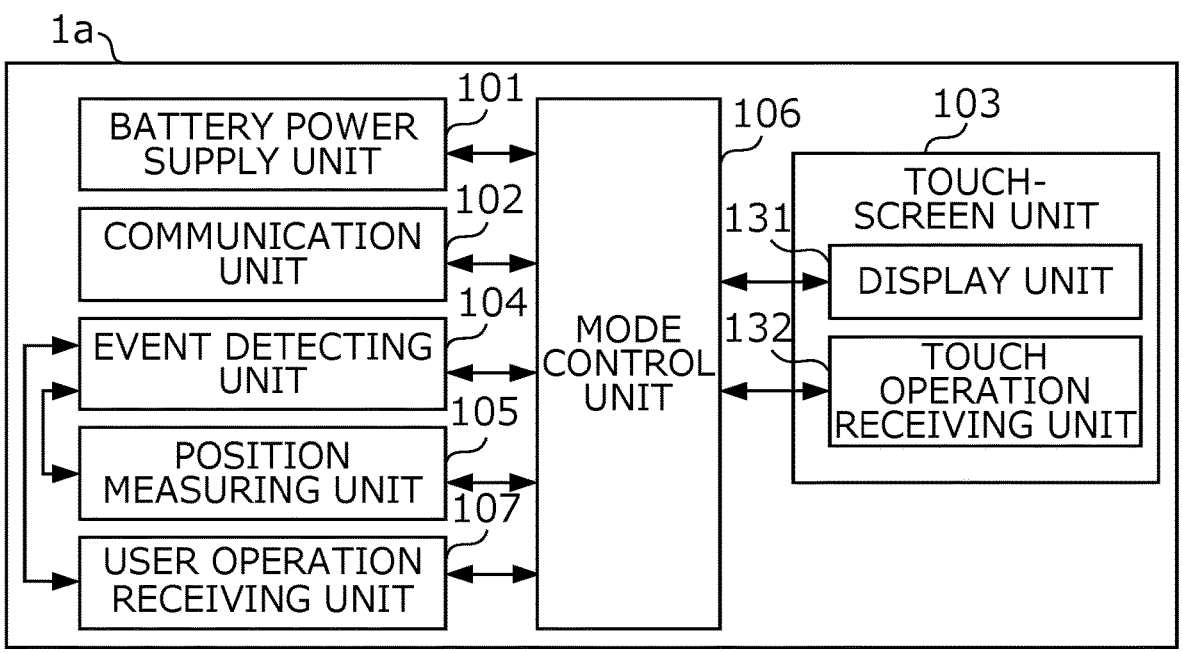
FIG. 8 is a diagram showing a configuration of functions provided by a smartphone according to a modification.

FIG. 8 shows a configuration of functions provided by smartphone 1a according to the present modification. Smartphone 1a includes user operation receiving unit 107 in addition to the units shown in FIG. 3.

User operation reception unit 107 performs a function for receiving a user's operation. User operation reception unit 107 is an example of an "operation receiving unit" according to the present invention. For example, button device 41 shown in FIG. 1 serves as user operation receiving unit 107. User operation reception unit 107, when receiving an operation on volume button 43, notifies receipt of the operation to event detecting unit 104. Event detecting unit 104, when receiving the notification, detects the reception of the operation on volume button 43 by user operation receiving unit 107 as an image rewrite event.

Subsequently, as in the case of the exemplary embodiment, in the first sleep mode, when the event detecting unit 104 detects the reception of the operation on volume button 43 by user operation receiving unit 107, mode control unit 106 causes battery power supply unit 101 temporarily to supply power to touch-screen unit 103 so that touch-screen unit 103 can rewrite a displayed image to an image according to the detected operation.

For example, it is assumed that an employee ID card image is associated with an operation on volume button 43-1, and a company mark image is associated with an operation on volume button 43-2. Under this assumption, when a user operates volume button 43-1 while display unit 131 is displaying an image other than the employee ID card image, mode control unit 106 causes display unit 131 to rewrite the displayed image to the employee ID card image associated with an operation on volume button 43-1.

An operation to be detected is not limited to the above operation, and any operation other than a touch operation received by touch-screen unit 103 in the first sleep mode may be detected. Whatever operation is detected, a user may cause a desired image to be displayed, as an event update display in the first sleep mode.

2-3 Image Rewrite Event (Part 2)

Image rewrite events are not limited to those described in the foregoing. In the exemplary embodiment, only measurement of a predetermined position is used as an image rewrite event in the first sleep mode. As another image rewrite event in the first sleep mode, mode control unit 106 may use reception of a connection request or document data which is used as a switching condition to start the second sleep mode in the exemplary embodiment.

Specifically, in the first sleep mode, when communication unit 102 receives a connection request, mode control unit 106 causes battery power supply unit 101 temporarily to supply power to touch-screen unit 103 so that touch-screen 103 can rewrite a displayed image to an image according to the received connection request, such as an incoming call image indicating that a call has been received.

Alternatively, in the first sleep mode, when communication unit 102 receives document data, mode control unit 106 stores the received document data in a storage means such as storage 13. Mode control unit 106 also causes battery power supply unit 101 temporarily to supply power to touch-screen unit 103 so that touch-screen 103 can rewrite a displayed image to an image according to the received document data, such as a document reception image indicating that document data has been received.

In the present modification, mode control unit 106 does not use reception of a connection request or document data as a switching condition to start the second sleep mode, because using the reception as the switching condition would make it impossible to perform an event update display based on the reception. By not using the reception as the switching condition, mode control unit 106 may cause an incoming call image or document reception image to be displayed while maintaining the first sleep mode.

In the exemplary embodiment, a switching condition for switching the first sleep mode to the active mode is not defined; however, in the present modification, normal pressing of main button 42 may be defined as a switching condition for switching to the active mode, not a switching condition for switching to the second sleep mode. Alternatively, normal pressing of main button 42 may be kept as a switching condition for switching to the second sleep mode, and twice pressing of main button 42 may be defined as a switching condition for switching to the active mode.

In either case, a user who has seen an event update display in the first sleep mode is able readily to start a call or browse document data as compared with a case where the switching condition for switching the first sleep mode to the active mode is not defined. In the exemplary embodiment, whenever a connection request or document data is received, the second sleep mode starts.

However, some calls may not be answered depending on a caller or a user's situation. Some document data may not be browsed immediately. In the present modification, an event update display is performed as described above so that a user may maintain the first sleep mode. The user also may switch the first sleep mode to the active mode to start a call or browse document data.

Alternatively, mode control unit 106 may perform an event update display for displaying a current time in the first sleep mode, and perform an event update display in the second sleep mode by use of measurement of a predetermined position as an image rewrite event. Alternatively, mode control unit 106 may perform an event update display by use of arrival of a predetermined time as an image rewrite event. For example, mode control unit 106 may cause a character string image for notifying an upcoming meeting to be displayed before the meeting starts.

Smartphone 1 is small enough to be put in a chest pocket, so that smartphone 1 may be provided with a heart rate sensor. In the first sleep mode or the second sleep mode, mode control unit 106 may perform an event update display by use of occurrence of a user's heart rate abnormality as an image rewrite event. Upon detecting occurrence of a user's heart rate abnormality, mode control unit 106 may cause a history of abnormal heart rates or a warning character string to be displayed.

As an image rewrite event, any event that can be detected by a function of smartphone 1 to display meaningful information may be used. In the first sleep mode or the second sleep mode, an event update display does not necessarily have to be performed, and may be replaced with a fixed display as in the case of the power-off mode to further minimize power consumption.

2-4 Image According to Position

An image according to a position measured by position measuring unit 105 is not limited to a company mark image or an employee ID card image. Now, a building is assumed, that includes normal floors whose security level is normal and high security floors whose security level is high. On the high security floors, a reader for reading a one-time password (a password issued by a system, which is valid for a certain period of time) is provided at doors.

In the building, mode control unit 106 may perform an event update display by use of measurement of a position indicating a high security floor or a normal floor as an image rewrite event. A position of a high security floor or a normal floor may be measured using WiFi positioning. Mode control unit 106, when measurement of a position indicating a high security floor is detected as an image rewrite event, causes touch-screen unit 103 to rewrite a displayed image to an image showing a one-time password such as a barcode.

Mode control unit 106, when measurement of a position indicating a normal floor is detected as an image rewrite event, causes touch-screen unit 103 to rewrite a displayed image to an image not showing a one-time password. When a user moves to a high security floor, his/her smartphone 1 automatically displays an image showing a one-time password; accordingly, s/he is able to open a door easily.

The longer an image showing a one-time password is displayed, the higher a risk that the one-time password becomes known to others. In the present modification, when a user has moved to a normal floor, his/her smartphone 1 automatically displays an image not showing a one-time password; accordingly, a risk that a one-time password becomes known to others is reduced.

As another example, assuming a store in which a user settles payment by passing a barcode or QR code (registered trademark) displayed on smartphone 1 over a reader, measurement of the store's position may be used as an image rewrite event. Mode control unit 106, when measurement of the store's position is detected as an image rewrite event, performs an event update display, causing display unit 131 to rewrite a displayed image to a code image usable at the store.

Mode control unit 106, when measurement of a position away from the store is detected as an image rewrite event, performs an event update display causing display unit 131 to rewrite a displayed image to an image different from the code image. According to the event update displays, a user is able to settle payment easily, and a risk that a code image becomes known to and abused by others is reduced. The event update display according to the present modification may be performed in either the first sleep mode or the second sleep mode.

2-5 Power-Off Image

A power-off image may vary depending on a situation. In the present modification, plural switching conditions for switching to the power-off mode, including a condition (hereinafter referred to as "long press condition") shown in FIG. 5 that is satisfied by holding main button 42 down, and a condition (hereinafter referred to as "battery depletion condition") that is satisfied by depletion of a battery are used. The battery depletion condition is an example of a "fourth condition" according to the present invention.

When one of the plural switching conditions is satisfied, mode control unit 106 switches an operation mode to the power-off mode. Before switching to the power-off mode, mode control unit 106 causes touch-screen unit 103 to rewrite a displayed image to an image according to the satisfied switching condition.

When the long press condition is satisfied, mode control unit 106 causes a user's selected wallpaper to be displayed continuously as a power-off image, and when the battery depletion condition is satisfied, mode control unit 106 causes an image showing user's contact information to be displayed continuously as a power-off image. Smartphone 1 is basically used and charged every day, so that its battery rarely runs out.

However, if smartphone 1 is lost and left uncharged for long time, its battery runs out. In the present modification, when the battery runs out, contact information is continuously displayed so that a possibility that lost smartphone 1 is returned to a user is increased.

When smartphone 1 is turned off by holding main button 42 down, a possibility that smartphone 1 is in a user's hand is high. In the present modification, when the long press condition is satisfied, a power-off image different from contact information is displayed continuously so that the user's personal information is not known to others.

2-6 Functional Configuration

A functional configuration of smartphone 1 is not limited to that shown in FIG. 3 or FIG. 8. For example, plural functional blocks shown in FIG. 3 may be integrated into one functional block. A function block including plural functions may be divided into plural functional blocks. From a functional block performing plural operations, one of the operations may be transferred to another functional block.

For example, event detecting unit 104 and mode control unit 106 may be integrated to perform a function that detects an event and also controls an operation mode. Power supply control and event update display performed by mode control unit 106 may be performed by plural functional blocks. Any functional configuration that functions in the same way as the functional configuration shown in FIG. 3 or FIG. 8 may be adapted.

2-7 Display Device

In the exemplary embodiment, an electrophoretic display device may be replaced with a reflective liquid crystal display using cholesteric liquid crystal that maintains the orientation of liquid crystal molecules after power is turned off. A display device according to the present invention includes a touch-screen unit that consumes power to rewrite a displayed image, but does not consume power to maintain the rewritten image.

The present invention may be applied to a display device including a touch-screen unit that consumes power to rewrite or maintain an image, such as a touch-screen unit including a backlight liquid crystal display. In the display device, battery power supply unit 101 supplies power selectively to display unit 131 and touch operation receiving unit 132 of the touch-screen unit.

In the first sleep mode, mode control unit 106 causes battery power supply unit 101 to supply power to display unit 131 and communication unit 102, and does not cause battery power supply unit 101 to supply power to touch operation receiving unit 132. Accordingly, the touch-screen unit is able to maintain a displayed image while the unit does not receive a touch operation.

In the first sleep mode, touch operation receiving unit 132 is not supplied with power, whereby power consumption of the touch-screen unit is reduced. On the other hand, communication unit 102 is provided with power to be in a standby state so that smartphone 1 is able to perform communication.

2-8 Categories of Invention

The present invention may be applied to a display device other than a smartphone, such as a tablet terminal, an electronic book terminal, or a notebook computer. In essence, the present invention may be applied to any display device that is described in the above modification section, and provides the functions shown in FIG. 3 or FIG. 8.

The present invention may be implemented in an information-processing method performed by a display device, or in a program for causing a computer to function as a display device. The program may be distributed in the form of a recording medium such as an optical disc, or may be downloaded and installed to a computer via a network such as the Internet.

2-9 Process

The order of processes, sequences, and flowcharts of exemplary embodiments described in the present specification may be changed as long as no inconsistency is caused. Methods described in the present specification include steps arranged in an exemplary order, and the steps may be arranged in another order.

2-10 Input or Output Information

Input or output information may be stored in a location such as memory, or may be managed in a management table. Input or output information may be overwritten, updated, or additionally written. Output information may be deleted. Input information may be sent to another device.

2-11 Software

Software should be interpreted broadly to include instructions, instruction sets, codes, code segments, program codes, a program, a subprogram, software modules, an application, a software application, a software package, a routine, a subroutine, an object, an executable file, an execution thread, a procedure, and a function, regardless of whether it is referred to as software, firmware, middleware, microcode, hardware description language, or by any other name.

Software and instructions may be sent and received via a transmission medium. For example, software may be sent from a website, a server, or another remote source, using a wired medium such as a coaxial cable, a fiber optic cable, a twisted pair, or a digital subscriber line (DSL), and/or a wireless medium such as infrared, wireless, or microwave. The wired medium and the wireless medium are included within the definition of a transmission medium.

2-12 Information and Signal

Information and signals described in the present specification may be represented using any of various technologies. For example, data, instructions, commands, information, signals, bits, symbols, and chips that are described in the foregoing, may be represented by voltages, currents, electromagnetic waves, magnetic fields or particles, optical fields or photons, or any combination thereof.

2-13 Meaning of "Based On"

The description "based on" used in the present specification does not mean "based only on," unless explicitly stated otherwise. In other words, the description "based on" means both "based only on" and "based at least on."

2-14 "And" and "Or"

In the present specification, a description "A and B" may be replaced with "A or B," and a description "A or B" may be replaced with "A and B," on condition that the replacement causes no problem for implementation of the present invention, and causes no inconsistency with other descriptions.

2-15 Variations of Embodiments

Exemplary embodiments described in the present specification may be used separately or in combination with minor changes. A notification of information (for example, a notification of "being X") may be made explicitly or implicitly.

The present invention is described in detail in the foregoing; however, it is apparent to those skilled in the art that the present invention is not limited to the embodiments described in the present specification. The present invention may be implemented in modified or changed embodiments, without departing from the spirit and scope of the present invention defined by the description of the claims. The description in the present specification is for illustrative purposes and is not intended to limit the present invention in any way.

DESCRIPTION OF REFERENCE NUMERALS 1 smartphone
11 processor
12 memory
13 storage
14 communication device
15 positioning device
21 input device
22 output device
23 touch-screen device
24 display
25 position detecting sensor
31 power supply device
32 battery
41 button device
42 main button
43 volume button
51 bus
52 power supply circuit
101 battery power supply unit
102 communication unit
103 touch-screen unit
104 event detecting unit
105 position measuring unit
106 mode control unit
107 user operation receiving unit
131 display unit
132 touch operation receiving unit

What is claimed is:

1. A display device comprising:
a power supply unit configured to supply power for the display device;
a communication unit configured to perform communication;
a display unit configured to display an image;
a touch receiving unit configured to receive a touch operation;
a measuring unit configured to measure a position of the display device;
a detecting unit configured to detect an event; and
a control unit configured to:
upon detecting that a first condition is satisfied, switch the display device to a first operation mode in which power is not supplied to the display unit and the touch receiving unit, and power is supplied to the communication unit and the measuring unit;
wherein, in the first operation mode, the control unit is further configured, in response to detection by the detection unit of a measured event indicative of a predetermined position measured by the measuring unit, to temporarily supply power to the display unit to enable the display unit to rewrite a first image of an identification (ID) card of a user according to the predetermined position, and in response to no such measured event, to temporarily supply power to the display unit to enable the display unit to rewrite a second image; and upon detecting that a second condition is satisfied, switch the display device to a second operation mode in which power is not supplied to the display unit and the measuring unit, and power is supplied to the communication unit and the touch receiving unit;

wherein, in the second operation mode, the control unit is further configured, in response to detection by the detection unit of a second event indicative of a passage of a period of time from a rewrite of a prior image, to temporarily supply power to the display unit to enable the display unit to rewrite one of a plurality of images upon detection of each second event.

2. The display device according to claim 1, wherein:
the display unit is configured to consume power to rewrite the displayed image and to consume no power to maintain a rewritten image; and
in the first operation mode and second operation mode, power is not supplied to the display unit while the display unit maintains the displayed image.

3. The display device according to claim 2, wherein the detecting unit is further configured to detect a device event that occurs in the display device, wherein in at least one the first operation mode and the second operation mode, the control unit is configured, in response to detection of the device event by the detecting unit, to temporarily supply power to the display unit to enable the display unit to rewrite the displayed image to an image according to the device event.

4. The display device according to claim 3,
wherein the detecting unit is further configured to detect reception of an operation from the user by the touch receiving unit; and
in the second operation mode, the control unit is further configured, in response to reception of the operation by the detecting unit, to temporarily supply power to the display unit to enable the display unit to rewrite the displayed image to an image according to the operation.

5. The display device according to claim 3, wherein in at least one of the first operation mode and the second operation mode, the control unit is further configured, in response to reception of data by the communication unit, to temporarily supply power to the touch-screen unit to enable the touch-screen unit to rewrite the displayed image to an image according to the data.

6. The display device according to claim 1, wherein the control unit is further configured, upon detecting that a fifth condition is satisfied, to switch the display device to a fourth operation mode in which power is temporarily supplied to the display unit to enable the display unit to rewrite the displayed image to an image according to an operation by the user, and power is supplied to the touch receiving unit and the communication unit.

7. The display device according to claim 1, wherein the control unit is further configured, upon detecting that at least a third condition is satisfied, to switch the display device to a third operation mode in which power is not supplied to the display device after the display unit rewrites the displayed image to a predetermined image.

8. The display device according to claim 7, wherein:
the power supply unit comprises a battery;
the at least third condition comprises a plurality of conditions comprising a fourth condition that is satisfied by depletion of the battery; and
the control unit is further configured, upon detecting that one of the plurality of conditions is satisfied, to switch the display device to the third operation mode after the display unit rewrites a displayed image to an image determined depending on whether the satisfied condition is the fourth condition.

9. The display device according to claim 1, wherein:
the control unit is further configured, in response to a battery depletion condition being satisfied, to temporarily supply power to the display unit to enable the display unit to rewrite an image of a user's contact information.

10. A display method for a display device having a communication unit, a measuring unit, a touch receiving unit, a detecting unit, a display unit and a control unit; the display method comprising:
performing communication by the communication unit;
receiving a touch operation by the touch receiving unit;
displaying an image by the display unit;
measuring a position of the display device by the measuring unit;
detecting, by the detecting unit, an event;
upon detecting that a first condition is satisfied, switching the display device to a first operation mode in which power is not supplied to the display unit and the touch receiving unit, and power is supplied to the communication unit and the measuring unit;
in the first operation mode, in response to detection by the detection unit of a measured event indicative of a predetermined position measured by the measuring unit, temporarily supplying power to the display unit to enable the display unit to rewrite a first image of an identification (ID) card of a user according to the predetermined position, and in response to no such measured event, temporarily supplying power to the display unit to enable the display unit to rewrite a second image;
upon detecting that a second condition is satisfied, switching the display device to a second operation mode in which power is not supplied to the display unit and the measuring unit, and power is supplied to the communication unit and the touch receiving unit; and
wherein, in the second operation mode, in response to detection by the detection unit of a second event indicative of a passage of a period of time from a rewrite of a prior image, temporarily supplying power to the display unit to enable the display unit to rewrite one of a plurality of images upon detection of each second event.

11. The display method according to claim 10 further comprising:
consuming power to rewrite the displayed image and consuming no power to maintain a rewritten image; and
in the first operation mode and second operation mode, power is not supplied to the display unit while the display unit maintains the displayed image.

12. The display method according to claim 11 further comprising:
detecting an event that occurs in the display device, wherein in the first operation mode, in response to detection of an event by the detecting unit, temporarily supply power to the display unit to enable the display unit to rewrite the displayed image to an image according to the event.

13. The display method according to claim 12, further comprising:
- receiving an operation from the user by the touch receiving unit;
- detecting, by the detecting unit, reception of the operation by the touch receiving unit; and
- in the second operation mode, in response to reception of an operation by the detecting unit, temporarily supplying power to the display unit to enable the display unit to rewrite the displayed image to an image according to the operation.

14. The display method according to claim 12, further comprising:
- in at least one of the first operation mode and the second operation mode, in response to reception of data by the communication unit, temporarily supplying power to the touch-screen unit to enable the touch-screen unit to rewrite the displayed image to an image according to the data.

15. The display method according to claim 10, further comprising:
- upon detecting that a fifth condition is satisfied, switching the display device to a fourth operation mode in which power is temporarily supplied to the display unit to enable the display unit to rewrite the displayed image to an image according to an operation by the user, and power is supplied to the touch receiving unit and the communication unit.

16. The display method according to claim 10, further comprising:
- upon detecting that at least a third condition is satisfied, switching the display device to a third operation mode in which power is not supplied to the display device after the display unit rewrites the displayed image to a predetermined image.

17. The display method according to claim 16, wherein:
- the at least third condition comprises a plurality of conditions including a fourth condition that is satisfied by depletion of a battery of the display device; and
- upon detecting that one of the plurality of conditions is satisfied, switching the display device to the third operation mode after the display unit rewrites a displayed image to an image determined depending on whether the satisfied condition is the fourth condition.

18. The display method according to claim 10, wherein:
- in response to a battery depletion condition being satisfied, temporarily supplying power to the display unit to enable the display unit to rewrite an image of a user's contact information.

* * * * *